United States Patent [19]
Davis

[11] 3,853,515
[45] Dec. 10, 1974

[54] CLEAN AIR SMOKE SCRUBBER

[75] Inventor: Woodrow W. Davis, Tabb, Va.

[73] Assignee: Bryan B. Palmer, Newport News, Va. ; a part interest

[22] Filed: Jan. 5, 1973

[21] Appl. No.: 321,263

[52] U.S. Cl.................. 55/257, 55/DIG. 20, 261/90
[51] Int. Cl............................................ B01d 47/06
[58] Field of Search ............ 55/257, 258, 260, 230, 55/DIG. 20; 110/119; 261/89, 90

[56] References Cited
UNITED STATES PATENTS

| | | | |
|---|---|---|---|
| 2,226,127 | 12/1940 | Harmon............................. | 55/230 X |
| 2,346,022 | 4/1944 | Gonia .............................. | 110/119 X |
| 3,045,990 | 7/1962 | Keenan, Jr................. | 55/DIG. 20 X |
| 3,053,615 | 9/1962 | Steinert............................. | 261/90 X |
| 3,348,830 | 10/1967 | Pearl et al......................... | 55/230 X |
| 3,498,028 | 3/1970 | Trouin .............................. | 55/257 X |

Primary Examiner—Frank W. Lutter
Assistant Examiner—William Cuchlinski, Jr.
Attorney, Agent, or Firm—Clarence A. O'Brien; Harvey B. Jacobson

[57] ABSTRACT

Gas cleaning apparatus having a housing provided with an inlet and outlet, and spray nozzles arranged for injecting a liquid, such as water, into the housing and washing gases passing from the inlet to the outlet. A truncated cone having a perforated wall is arranged adjacent the inlet of the housing for distributing polluted gases into the washing liquid. A fan draws the gases into the cone, while a rotor having a perforated base and vanes mounted on the base agitates the washing liquid to assure saturation of particles of residue in the gases, and slings the residue and liquid outwardly against the housing. A sleeve arranged within the housing and partly surrounding the cone keeps excess liquid away from the initially distributed gases; wedge-shaped ledges on the cone keep the liquid from entering the cone perforations and passing into a stack, and the like, on which the apparatus is mounted.

14 Claims, 4 Drawing Figures

CLEAN AIR SMOKE SCRUBBER

BACKGROUND OF THE INVENTION

1. Field of the Invention

This invention relates generally to apparatus for cleaning gases, and particularly to an air smoke scrubber.

2. Description of the Prior Art

Scrubbers are known that clean or purify industrial and other gases, including air, by mixing a liquid into the gases. U.S. Pat. No. 2,226,127, for example, shows an apparatus using a revolving spray manifold directing a washing liquid in the direction of movement of the gases to be cleaned. This arrangement causes the residue in the gases to be driven against and clog a downstream baffle plate. Further, the mixing of the liquid and gases may be insufficient to cause saturation of the gases, thus reducing the efficiency of the washing operation.

SUMMARY OF THE INVENTION

It is an object of the present invention to provide gases cleaning apparatus having improved liquid-gas mixing when compared with known apparatus of this kind.

Another object of the present invention is to provide a liquid-gas mixing scrubber which keeps excess liquid away from saturated gases.

Yet another object of the present invention is to provide a gas scrubber which is inherently self-cleaning.

Still another object of the present invention is to provide a gas scrubber suitable for mounting atop a stack, chimney, and the like.

These and other objects are achieved according to the present invention by providing gases-cleaning apparatus having: a housing provided with an inlet and outlet; devices arranged for injecting liquid into the housing and washing gases passing through the housing from its inlet to its outlet; and a hollow member arranged in the housing for distributing into the washing liquid gases received from the housing inlet.

Advantageously, the hollow member is a truncated cone having its base of largest area forming an open side and arranged adjacent the housing inlet for receiving gases therefrom, its other base forming a closed side, and a wall arranged extending between the bases and provided with a plurality of perforations through which gases pass from the cone into the housing. A plurality of annular wedge-shaped ledges are preferably mounted on an outer surface of the perforated wall of the truncated cone for deflecting washing liquid away from the perforations. In this manner, the washing liquid is prohibited from entering into the cone from the housing and passing into a stack or chimney on which the housing is mounted.

A fan may be arranged in the cone so as to function as an impeller and draw gases into the cleaning apparatus. A rotor having a perforated base and vanes mounted on the base is arranged between the truncated cone and the housing outlet for agitating the gases while they are subjected to a flow of washing liquid. According to an advantageous feature of the present invention, the liquid injecting devices are a plurality of spray nozzles arranged extending into the housing, and divided into two sets cooperatively embracing and directed toward the rotor.

The rotor acts to sling particles of residue which have been saturated with the washing liquid toward the housing wall. A sleeve may be mounted in the housing and arranged surrounding a portion of the truncated cone for forming a liquid flow path which diverts washing liquid away from the cone and prevents saturation of the distributed gases.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
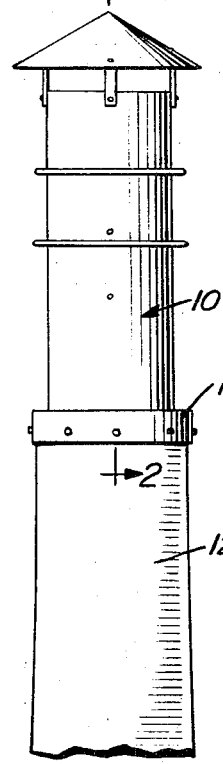
FIG. 1 is a fragmentary, side elevational view showing a scrubber according to the present invention mounted on top of a stack or chimney.

FIG. 1 of the drawings shows a scrubber 10 according to the present invention mounted on a conventional stack or chimney 12 as by a cylindrical shell adapter 14.

Figure 2:
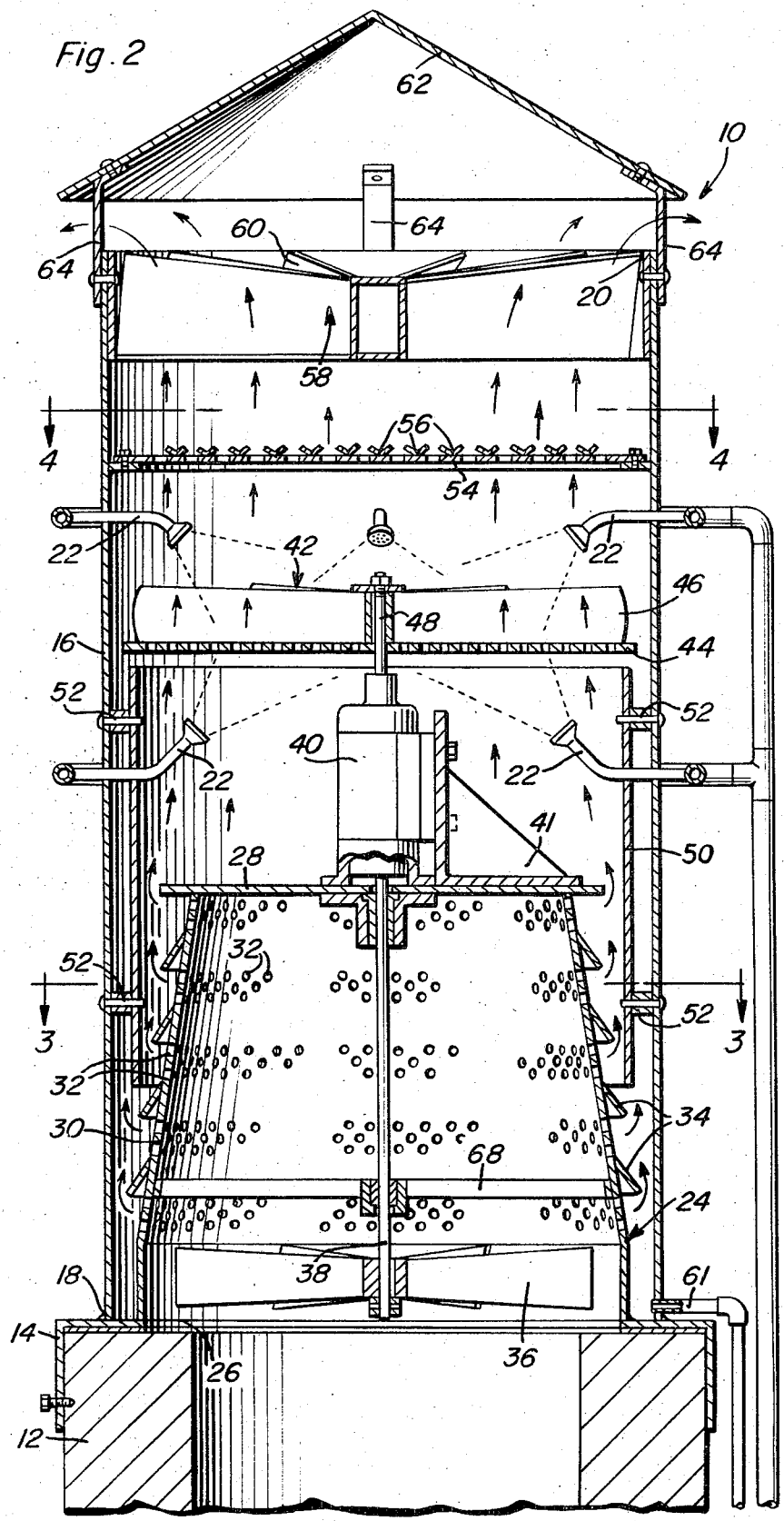
FIG. 2 is a fragmentary, sectional view taken generally along the line 2—2 of FIG. 1.

Referring now to FIG. 2 of the drawings, scrubber 10 is formed by a cylindrical outer shell or housing 16 having an inlet 18 and an outlet 20. Spray nozzles 22 are arranged extending into housing 16 for injecting a suitable liquid, such as water, into housing 16 and washing gases, designated by the flow arrows, passing through housing 16 from inlet 18 to outlet 20. The liquid is supplied nozzles 22 from a suitable, known source (not shown) and a conventional manifold arrangement.

A hollow truncated cone 24 is arranged with its base of largest area adjacent housing inlet 18. This base forms an open side, and the base arranged opposite the open side is closed by a plate 28 to form a closed side. Between the open and closed sides extends a wall 30 provided with a plurality of perforations 32. It is these perforations 32 which cause cone 24 to distribute into the washing liquid gases received from inlet 18. These gases pass into cone 24 through the open side thereof, designated 26 in FIG. 2. A plurality of annular ledges 34 are mounted in a known manner on an outer surface of wall 30, and are arranged for deflecting washing liquid away from perforations 32. For this purpose, each ledge 34 has a wedge-shaped cross section.

The gases are drawn into housing 16 and cone 24 by a fan 36 arranged adjacent inlet 18 and open side 26 to function as an impeller. A shaft 38 mounts fan 36 to a, for example, suitable, known electric motor 40 for rotation of fan 36 by the motor. A bracket 41 mounts motor 40 on plate 28, while shaft 38 is journaled in conventional bearings. There is also provided a rotor 42 for agitating the gases and slinging outwardly liquid and residue particles. This rotor 42 has a perforated base plate 44, and vanes 46 mounted on plate 44 for rotation therewith. A shaft 48 is connected to motor 40 so as to be rotated together with shaft 38, and to rotor 42 for rotating same.

Figure 3:
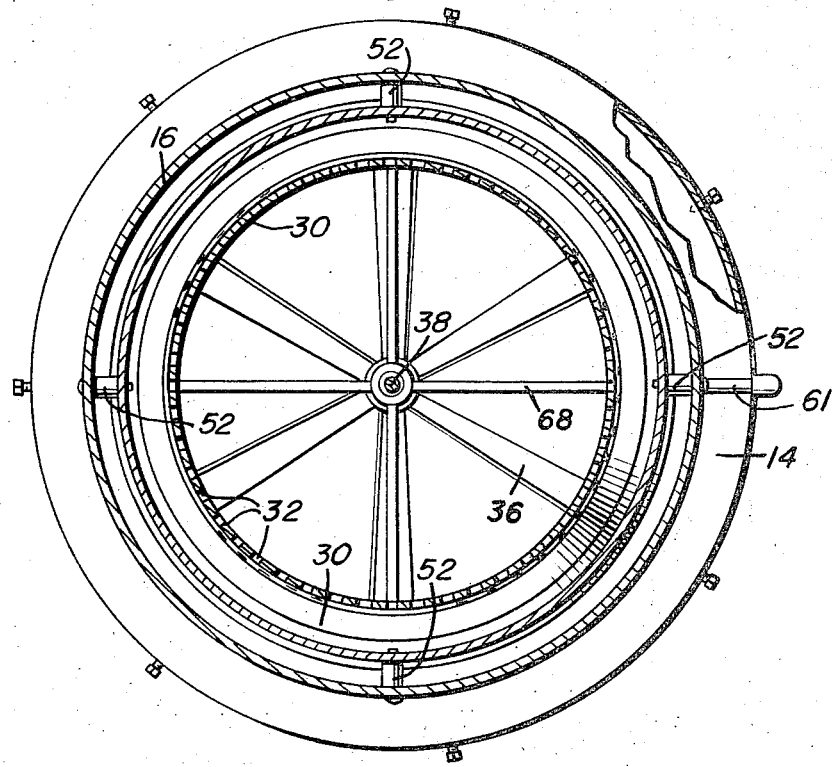
FIG. 3 is a sectional view taken generally along the line 3—3 of FIG. 2.

A cylindrical inner shell or sleeve 50 is mounted on housing 16 as by spacers 52 (see also FIG. 3), and is arranged surrounding a portion of cone 24 and extending adjacent plate 44, for receiving liquid and residue particles slung from rotor 42 and keeping that portion of the washing liquid away from cone 24 and eliminating the possibility of cone 24 and its ledges 34 becoming overly saturated. Spray nozzles 22 are divided into two sets cooperatively embracing and directed toward rotor 42 for being caught up in the swirl created by rotation of that rotor.

Figure 4:
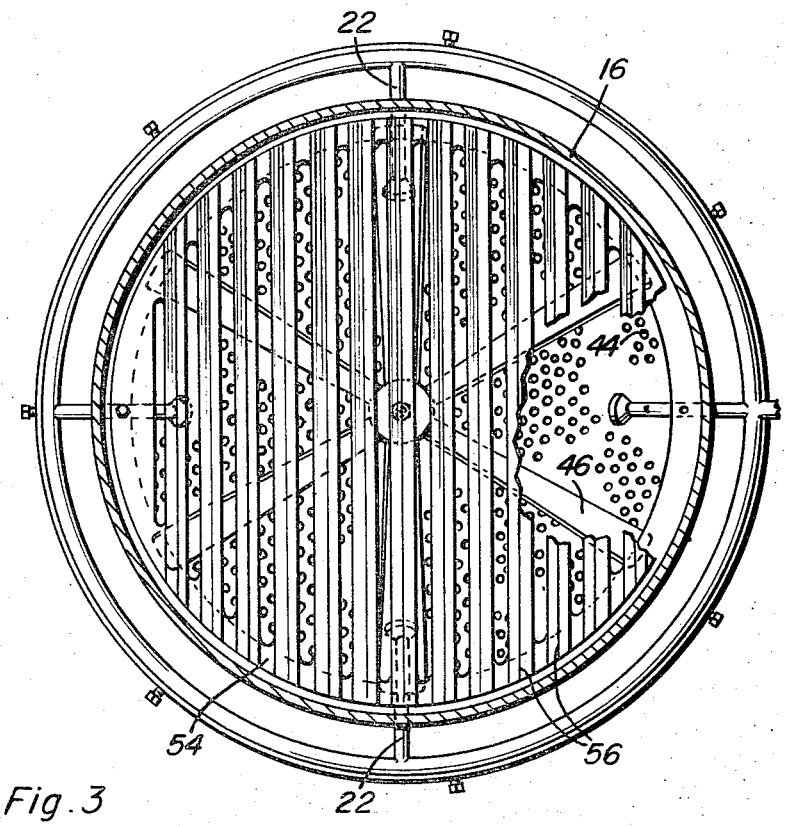
FIG. 4 is a sectional view taken generally along the line 4—4 of FIG. 2.

In order to prevent some of the washing liquid from passing out of housing 16, a perforated baffle plate 54 provided with baffle strips 56 (see also FIG. 4), and a liquid eliminator assembly 58 having flat, overlapping vanes 60 are arranged between rotor 42 and housing outlet 20. These elements will catch liquid droplets passing their way, with the latter acting as a back-up for the former. As can be readily seen from FIGS. 2 and 4 of the drawings, plate 54 has a series of parallel, longitudinally extending slots, and the baffle strips 56 are arranged between these slots.

The bottom portions of housing 16 and cone 24 cooperate to form an annular chamber which receives the washing liquid and residue particles separated from the gases. A drain pipe 61 drains this liquid and residue from the chamber, and carries it to, for example, a conventional filtering unit (not shown). The filtered liquid may then pass to a, for example, storage tank for recycling in scrubber 10.

A cone-shaped hood 62 is advantageously arranged covering housing outlet 20. Positioning of hood 62 may be achieved by means of a plurality of brackets 64 connected to housing 16 adjacent outlet 20.

Once positioned on top of a stack, chimney, and the like, as illustrated in FIG. 1 of the drawings, a scrubber 10 according to the present invention will have smoke or polluted air from the stack, and the like, drawn into inlet 18 in cone 24 by means of fan 36. It should be mentioned that motor 40 may be positioned directly beneath hood 62 to make it more accessible and out of the way of the spray from nozzle 22. This can be easily accomplished by extending shaft 38 through the center of the entire unit. Crossbar 68 cooperates with the bearings to center shaft 38. Once into cone 24, the smoke or polluted air is split up and distributed into housing 16 through perforations 32 and over ledges 34. It is at this point, adjacent ledges 34, that the first contact of the air with the washing liquid occurs. Ledges 34 are placed in such a manner that the washing liquid will flow over them from plate 28 falling onto the center of the top ledge 34 and so on down into the annular chamber at the bottom of housing 16 and cone 24. The function of ledges 34 is to keep the excess liquid that is sprayed on the bottom surface of rotor 42 from making contact with cone 24 and thereby seeping into stack or chimney 12. It should also be mentioned that the bottom of scrubber 10 is squared off in the horizontal plane as seen in FIGS. 1 and 2 across its full diameter to facilitate mounting on chimney or stack 12 by means of adapter 14. Further, suitable hand-holds, and the like, may be provided on housing 16 where needed to facilitate handling. Plate 28 may be sealed onto cone 24 as with suitable gaskets to prevent liquid from seeping between the connection.

Once the smoke or polluted air passes from cone 24, it is agitated and swirled together with the washing liquid by rotor 42. In this manner, particles of residue in the air are saturated by means of washing liquid flowing over the top and outside radius of vanes 46 and creating an undertow motion of the washing liquid. The residue is enveloped on the underside of the rolling washing liquid, and rotor 42 slings the liquid and residue together against housing 16. This liquid and residue is trapped between housing 16 and sleeve 50, and is fed into the drain ring formed by the annular chamber at the bottom of housing 16 and cone 24.

Once the particles of residue are separated from the air, smoke, or other gases, the gaseous flow is toward perforated baffle plate 54 which tends to eliminate any droplets of liquid therein. It should be noted that baffle strips 56 are preferably provided with a V-shaped cross section. That is, they have a pair of flange-like wings extending toward the slots in plate 54. The latter may be, for example, bolted to a flange welded to housing 16. Any liquid droplets that may get through the baffle plate assembly just discussed, will be caught by liquid eliminator assembly 58. The flat, overlapping vanes 60 of assembly 58 act to stop any liquid or residue that may have escaped entrapment through the previous operations.

The scrubber 10 according to the present invention provides a simple and efficient device which may be used with existing structure without any modification necessary other than that which may be required to run the water and electric lines to the unit. Once installed, the scrubber will perform reliably with a minimum of maintenance.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is:

1. Apparatus for cleaning gases, comprising, in combination:
   a. a housing having an inlet and outlet;
   b. means for injecting a liquid into the housing and washing gases passing through the housing from the inlet to the outlet; and
   c. means arranged in the housing beneath the injecting means for distributing into the washing liquid gases passing through the housing, the distributing means being a hollow member in the form of a truncated cone having a base of largest area forming an open side arranged adjacent the housing inlet for receiving gases therefrom, a closed side arranged opposite the open side, and a wall arranged extending between the open and closed sides and provided with a plurality of perforations through which gases pass from the hollow member into the housing, and a plurality of annular ledges mounted on an outer surface of the perforated wall and arranged for deflecting washing liquid away from the perforations, each ledge having a wedge-shaped cross section.

2. A structure as defined in claim 1, further including means for drawing gases into the housing, and means for agitating the gases while subjected to a flow of washing liquid and slinging outwardly washing liquid and residue particles.

3. A structure as defined in claim 2, wherein the drawing means is a fan arranged as an impeller, a motor, and a shaft mounting the fan to the motor for rotation thereby, and the agitating means is a rotor having a perforated base plate and a vane mounted on the base plate, and a shaft connected to the motor for being rotated thereby and to the rotor for rotating same.

4. A structure as defined in claim 3, further including a sleeve mounted on the housing and arranged surrounding a portion of the hollow member and extending adjacent the rotor for receiving washing liquid and residue particles slung from the rotor and keeping that portion of the washing liquid and particles away from the cone and preventing the cone and the associated ledges from becoming overly saturated.

5. A structure as defined in claim 4, wherein the injecting means includes a plurality of nozzles arranged extending into the housing, the nozzles being divided into two sets cooperatively embracing and directed toward the rotor.

6. A structure as defined in claim 5, further including means arranged in the housing between the injecting means and the housing outlet while preventing liquid from passing out of the housing.

7. A structure as defined in claim 6, wherein the preventing means includes a perforated baffle plate provided with baffle strips, and a liquid eliminator assembly having a plurality of flat-overlapping vanes.

8. A structure as defined in claim 7, further including a hood arranged covering the housing outlet.

9. A structure as defined in claim 1, further including a sleeve mounted on the housing and arranged surrounding a portion of the hollow member for keeping a portion of the washing liquid away from the hollow member and preventing same from becoming overly saturated.

10. A structure as defined in claim 9, wherein the housing and sleeve are hollow cylinders.

11. A structure as defined in claim 1, further including means arranged in the housing between the injecting means and the housing outlet while preventing liquid from passing out of the housing.

12. A structure as defined in claim 11, wherein the preventing means includes a perforated baffle plate provided with baffle strips, and a liquid eliminator assembly having a plurality of flat-overlapping vanes.

13. A structure as defined in claim 1, wherein the injecting means includes a plurality of nozzles arranged extending into the housing.

14. A structure as defined in claim 1, further including a hood arranged covering the housing outlet.

* * * * *